N. GRINWIS.
DIRIGIBLE SPOT LIGHT.
APPLICATION FILED FEB. 11, 1920.
1,367,962.
Patented Feb. 8, 1921.
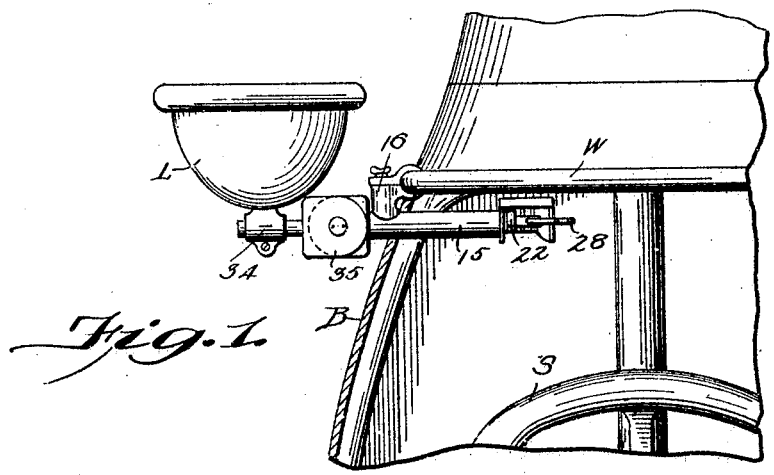
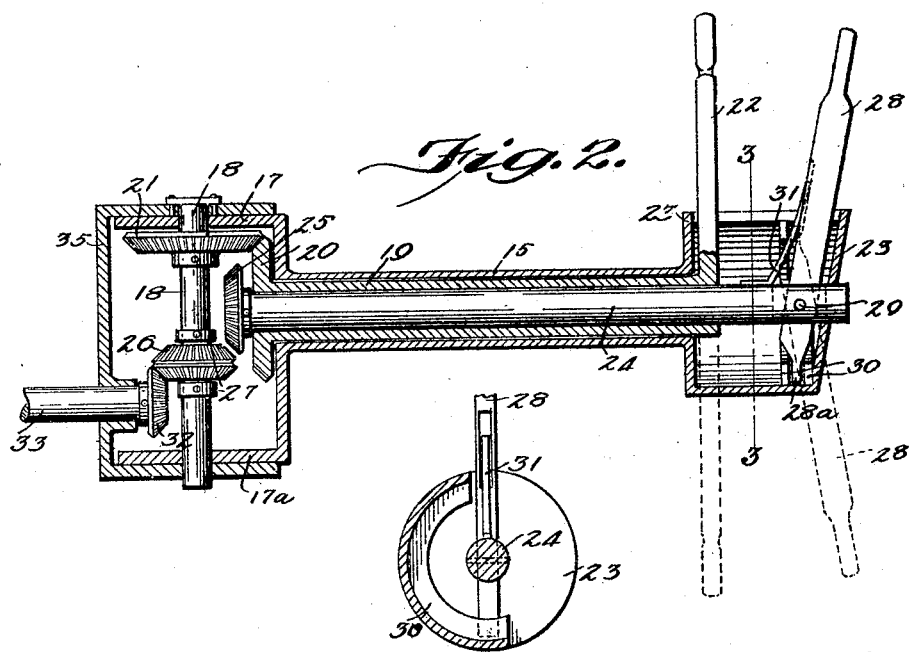

UNITED STATES PATENT OFFICE.

NICKOLAS GRINWIS, OF NEW ERA, MICHIGAN.

DIRIGIBLE SPOT-LIGHT.

1,367,962.   Specification of Letters Patent.   Patented Feb. 8, 1921.

Application filed February 11, 1920. Serial No. 357,787.

*To all whom it may concern:*

Be it known that I, NICKOLAS GRINWIS, a citizen of the United States, and a resident of New Era, in the county of Oceana and State of Michigan, have invented certain new and useful Improvements in Dirigible Spot-Lights, of which the following is a specification.

My invention relates to spot-lights for motor vehicles, and a purpose of my invention is the provision of a mechanism by means of which a spot-light is rendered dirigible to allow of its adjustment so that its rays may be projected to any desired point.

It is also a purpose of my invention to provide a dirigible spot-light mechanism which can be operated from a point interiorly of an automobile thus rendering it applicable to closed cars and operable through the side curtains of an open car.

I will describe one form of spot-light mechanism and will then point out the novel features thereof in claims.

In the accompanying drawings:

Figure 1 is a fragmentary view showing in top plan and partly in section a closed automobile having applied thereto one form of spot-light and mechanism therefor embodying my invention.

Fig. 2 is a longitudinal sectional view of the mechanism shown in Fig. 1 with the spot-light omitted.

Fig. 3 is a vertical sectional view taken on the line 3—3 of Fig. 2.

Referring specifically to the drawings, in which similar reference characters refer to similar parts, and particularly to Fig. 1, I have here shown a conventional form of closed automobile including a wind shield W, a steering wheel S and the side portion of a closed body B. Supported upon the wind shield W and extending through the body B is the mechanism embodying my invention for rendering a spot-light L dirigible.

As shown in Fig. 2, the mechanism embodying my invention comprises a shaft housing 15 supported upon the wind shield W by means of a bracket 16 in such manner as to extend transversely through the body B so that its inner end is disposed in advance of the steering wheel W and within easy reach of the driver of the vehicle. The outer end of the housing 15 is provided with laterally disposed arms 17 and 17ᵃ in which is fixed an axle 18. Rotatably mounted within the housing 15 is a hollow shaft 19, the forward end of which is provided with a beveled gear 20 that meshes with a similar gear 21 fixed to the axle 18 at a point adjacent its upper end. The rear or inner end of the shaft 19 is provided with an offset handle 22 that is arranged for lateral movement within a casing 23 formed on the inner end of the housing 15. By means of the handle 22, the shaft 19 can be manually rotated to effect a rotation of the shaft 18 through the medium of the gears 20 and 21. Journaled within the shaft 19 is a solid shaft 24 the outer end of which is provided with a bevel gear 25 that is adapted to mesh with a double bevel gear 26 rotatably mounted upon the axle 18 but locked against longitudinal movement by a pair of collars 27. The inner end of the shaft 24 projects beyond the inner end of the shaft 19 and is seated within one wall of the casing 23 in a manner to permit free rotation of the shaft. The inner end of the shaft 24 is provided with a handle 28 which is pivoted to the shaft by a pin 29. The lower end of the handle 28 is provided with an extension 28ᵃ which works within a channel formed in the casing by a pair of guide plates 30. As shown in Fig. 3, the guide plates are of semi-circular formation so that the handle 28 is guided in its movement through an arc of substantially 180° by means of the extension 28ᵃ. The handle 28 is biased inwardly by means of a leaf spring 31 which is fixed to the shaft 24 with its free end bearing against the handle in such manner as to cause the extension 28ᵃ to bear against the inner flange 30 so that the handle 28 normally occupies the position wherein the shaft 24 is moved inwardly to cause the gear 25 to disengage the gear 26. However, when the handle 28 is moved forwardly against the tension of the spring 31, an outward movement of the shaft 24 is secured thereby causing the gear 25 to mesh with the gear 26.

The gear 26 meshes with a bevel gear 32 fixed to the inner end of a shaft 33. As shown in Fig. 1, the shaft 33 supports the spot-light L the latter being secured to the former by means of a suitable form of clamps 34. As shown in Fig. 2, the inner end of the shaft 33 is journaled in a substantially U-shaped yoke 35, the parallel portions of which receive and are secured to the axle 18 so that upon rotation of the latter, a movement of the yoke is effected to cause a lateral shifting of the shaft 33.

In operation, the handles 22 and 28 normally occupy the position shown in Fig. 2 wherein it will be seen that the gear 20 is in mesh with gear 21 while the gear 25 is out of mesh with the gear 26. When it is desired to elevate or lower the spot-light L, the handle 28 is moved forwardly thus causing the gear 25 to mesh with the gear 26. In this position, the handle is now moved laterally in one direction or the other so as to cause rotation of the shaft 24 whereby a rotation of the shaft 33 is effected to cause a lowering or elevating of the light according as the handle is moved in one direction or the other. It will be understood that during this lateral movement of the handle 28, the extension 28ᵃ moves within the channel between the flanges 30 so that as soon as pressure upon the handle is removed, the spring 31 will again actuate the handle to move the shaft and consequently the gear 25 out of mesh with the gear 26.

When it is desired to effect a lateral adjustment of the spot-light L in either direction, the handle 22 is shifted laterally so as to effect rotation of the shaft 19 in one direction or the other whereby the rotation of the axle 18 is effected through the medium of the gears 20 and 21. As the axle 18 is fixed to the yoke 35 it will be obvious that upon rotation of the form, the yoke will be moved forwardly or rearwardly according as the handle 22 is moved in one direction or the other whereby the spot-light L is caused to swing either forwardly or rearwardly about the axle 18 as a center.

From the foregoing operation, it will be manifest that a vertical adjustment of the spot-light can be had through manipulation of the handle 28 while a horizontal adjustment of the same can be secured through the manipulation of the handle 22. As the gear 25 in its normal position is out of mesh with the gear 26, the gear 26 is free to rotate to allow the adjustment of the yoke 35 so that the mechanism for effecting the vertical adjustment of the spot-light does not interfere with the operation of the mechanism for securing the horizontal adjustment of the spot-light.

In the applied position of the spot-light and mechanism as shown in Fig. 1, it will be noted that the handles 22 and 28 are disposed in a convenient position with respect to the driver of the vehicle so that he can manipulate either handle from a point within the car. This renders the mechanism applicable to closed cars and operable through the side curtains of an open car.

Although I have herein shown and described only one form of dirigible spot-light mechanism embodying my invention, it is to be understood that various changes and modifications may be made herein without departing from the spirit of the invention or the spirit and scope of the appended claims.

What I claim is:

1. A mechanism for dirigible spot-lights comprising, an axle, a yoke fixed to the axle, a light supporting shaft journaled in said yoke, means for rotating said axle, a gear rotatable on said axle and operatively connected to said shaft, and means for rotating said gear.

2. A mechanism for dirigible spot-lights comprising, a shaft housing, arms formed on one end of the housing, an axle journaled in said housing, a yoke fixed to said axle, a light supporting shaft journaled in said yoke, means for rotating said axle, and means for rotating said shaft independently of said yoke.

3. A mechanism for dirigible spot-lights comprising, a shaft housing, arms formed on one end of the housing, a casing formed on the opposite end of the housing, a hollow shaft journaled in said housing, a second shaft journaled within the first shaft and movable longitudinally therein, an axle journaled in said arms and operatively connected to the first shaft, a gear rotatably mounted on said axle, a yoke fixed to said axle, a light supporting shaft journaled in said yoke and operatively connected to said gear, a gear fixed to the second shaft and adapted to mesh with the first gear, means for rotating the first shaft, and means for rotating the second shaft and shifting the same longitudinally to cause the second gear to engage or disengage the first gear.

4. A mechanism for dirigible spot-lights comprising, a light supporting shaft, a yoke rotatably receiving said shaft, means for rotatably supporting said yoke, means for rotating said yoke in either direction comprising an axle, a shaft operatively connected to said axle, and a laterally disposed handle fixed to said shaft, and means for rotating said shaft independently of said yoke comprising, a gear rotatably mounted on said axle and operatively connected to the light supporting shaft, a shaft for rotating said gear, means for biasing said shaft into an inoperative position with respect to said gear, and a handle for rotating said shaft and for moving the same against said biasing means to operatively connect the same to said gear.

5. A mechanism for dirigible spot-lights comprising, an axle, means for rotatably supporting the axle, a yoke fixed to said axle, a shaft journaled in said yoke, a gear rotatably mounted on said axle, a gear fixed to the light supporting shaft and meshing with said gear, means for rotating said axle, and means for rotating the first gear comprising, a shaft, a gear fixed to said shaft and adapted to mesh with the first gear, means for supporting said shaft to permit longitudinal movement thereof, a handle pivoted on said shaft, an extension formed on said handle, spaced flanges for receiving said extension, and a spring carried by said shaft and engageable with said handle, for the purpose described.

NICKOLAS GRINWIS.